Nov. 23, 1965         G. B. GREENE ET AL         3,219,165
         PNEUMATIC CONTROL FOR TYPEWRITERS REQUIRING
                NO VACUUM OR PRESSURE SOURCE
Filed Sept. 28, 1962                          8 Sheets-Sheet 1

INVENTORS
GEORGE B. GREENE
ALEX NYFELER
WAYNE E. WILLIS
BY:
Lippincott, Ralls & Hendrickson
ATTORNEYS

INVENTORS
GEORGE B. GREENE
ALEX NYFELER
WAYNE E. WILLIS

*Lippincott, Ralls & Hendrickson*
ATTORNEYS

United States Patent Office 3,219,165
Patented Nov. 23, 1965

1

3,219,165
PNEUMATIC CONTROL FOR TYPEWRITERS REQUIRING NO VACUUM OR PRESSURE SOURCE
George B. Greene, Pinole, Alex Nyfeler, Sunnyvale, and Wayne E. Willis, Concord, Calif., assignors to Greene Datatape Incorporated, Kearny, N.J., a corporation of New Jersey
Filed Sept. 28, 1962, Ser. No. 226,891
8 Claims. (Cl. 197—20)

The present invention relates to an automatic typewriter, particularly to an apparatus adapted for association with a typewriter to provide automatic typing from a punched tape reader, automatic tape punching while operating the typewriter, or normal typewriter operation.

Typewriters have been modified in the past to operate under the control of punched tape. Numerous machines capable of substantially automatic operation by control from a punched tape are available. Conventionally, these machines are exceeding complex. This complexity is greater when the machine must also serve to punch tape.

The present invention is directed to apparatus for attaching conventional typewriters, particularly electric typewriters, to a tape reader and tape punch. While the invention is not necessarily limited to any particular typewriter, the following description of a preferred embodiment uses an electric typewriter—specifically, one having a single globular unit called a typing element. In contrast to most typewriters, this machine does not have typebars or a moving carriage. Instead, the typing element, which has raised letters and numbers, is directly controlled by the keys of a conventional typewriter keyboard. It moves across the paper and rotates about two axes, so that the letter striking the paper is the one selected by the keyboard. Such a typewriter is presently marketed by International Business Machines Corporation under the trade name "Selectric."

In contrast to conventional automation equipment for typewriters, the present invention provides a remarkably uncomplicated way of controlling a typewriter from a punched tape, and also of punching the tape by operating the typewriter. The normal operation of the typewriter on which the apparatus of the invention is used is in no way altered, except that under certain circumstances the actual impression of a character upon the paper is prevented. All the functions of the typewriter itself remain unchanged, but the operation of the various portions of the typewriter additionally actuates a tape punch, or functions in response to a tape reader. The physical mechanism for attaching the typewriter to the tape punch and reader uses two banks of two-sided hinges, the sides of which are held together when a seal is applied to the sealable closure between them. The apparatus uses a control system for selectively applying such a seal to various hinges. Although an air system is used for this control, it differs from conventional ones because no high pressure or vacuum reservoir is required.

The relative simplicity of the apparatus of the invention results in a substantial reduction in cost. It is well recognized that commercially available apparatus for automating electric typewriters with tape punch and reader functions are exceedingly expensive and complex. This complexity reduces the reliability of the apparatus because a large number of elements and connections increases the number of breakdowns and errors.

The apparatus of the invention connects a tape punch to a typewriter so that the operation of the typewriter automatically causes the tape punch to punch a specific pattern of holes in a tape corresponding to the particular key of the typewriter which was struck. It also connects a

2 tape reader to the typewriter so that the typewriter automatically carries out a desired operation corresponding to the pattern of holes read in a tape.

Very briefly, in a preferred embodiment of the invention, using a "Selectric" typewriter, the apparatus includes two banks of two-sided hinges. One side of each of six of the first bank of hinges engages operating elements of the typewriter. When selected ones of these six sides are pivoted, the typewriter is caused to strike a selected key. The remaining hinges are used to transmit pressure signals to the control apparatus. The first sides of these hinges are held to their corresponding sides when a seal is applied to a sealable closure between them. During each operation of the typewriter, all the second sides are pivoted. The choice of character printed is regulated by selectively applying a seal to a closure between the two sides of selected hinges. Then, the first sides of only those selected hinges are pivoted along with the second sides.

The second bank has eight hinges. One side of each engages operating elements of the tape punch. When selected ones of these sides are pivoted, a desired pattern of holes is punched in a tape. In the same way as in the first bank, during each operation of the typewriter, all of the second sides of the second bank of hinges are pivoted. Again, however, the first sides of only those hinges having a seal applied to a closure between the sides will be pivoted along with the second sides.

A control system is provided for each bank of hinges to apply the seals to the desired hinges only. The tape itself acts as a seal. There can be no seal applied to any hinge closures connected to a tape reader port which is open to the atmosphere through a hole in the tape; where the tape is blank, however (no hole), there will be a seal at the hinge connected to that reader port.

A substantial part of the invention's simplicity is the result of the unique control system for determining which operation the typewriter is to perform. Not only does the typewriter have 44 TYPE operations, one for each character, but it also has seven COMMAND operations, namely: SPACE, BACKSPACE, CARRIAGE RETURN, INDEX (line feed), UPPER CASE, LOWER CASE, and TABULATE. In the prior art, the control apparatus for operation of a typewriter from tape was extremely complex; the apparatus of this invention, as a minimum, requires only three hinges in addition to the six required for character selection, plus 14 switches for reading; for punching, another nine hinges are used, plus 13 punch-selecting switches.

The present invention is illustrated as to a single, preferred embodiment thereof in the following drawings, in which.

Figure 1:
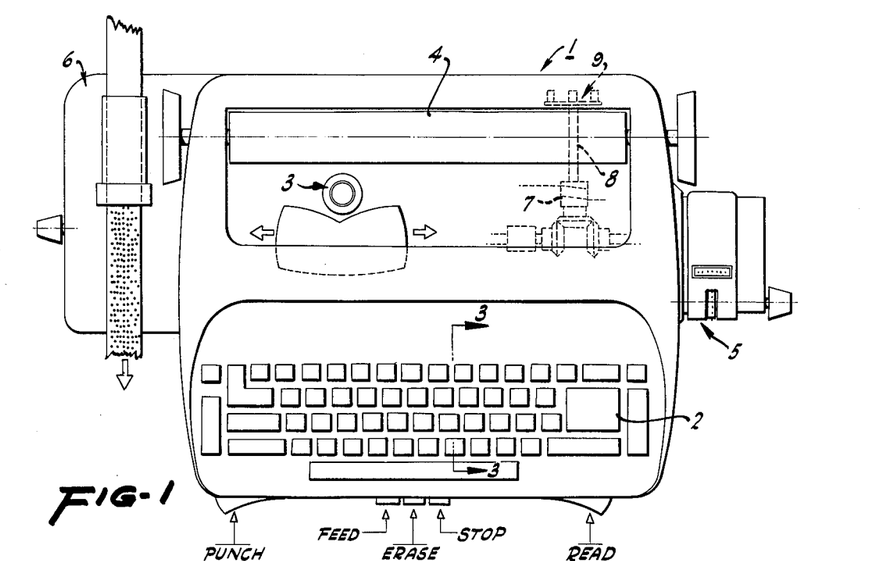
FIG. 1 is a plan view of a Selectric typewriter with the apparatus of the invention attached.

Referring to FIG. 1, a "Selectric" typewriter 1 is shown. This typewriter has a manual keyboard 2, a ball-type typing element 3, and a printing platen 4. The typewriter is provided with a punched tape reader 5 and a tape punch 6. Although the apparatus of this invention is used to adapt the typewriter for tape reading and punching, it is helpful first to have a clear understanding of the operation of a "Selectric" typewriter. The typewriter has a maximum of 44 printed characters. Contrary to other typewriters, the "Selectric" typewriter does not use a separate signal for the operation of each of the 44 keys. Instead a coded system is used, so that only six signals are required to operate 44 keys (4 rows of 11). There are six selecting bails: two determine which of 4 rows the character is in, and the other four determine which character in the row it is. Each key actuates some different combination of the six bails—this might be any one, any two, any three . . . up to and including all six bails. For example, when the letter "x" is depressed on the typewriter keyboard, a certain specific combination of bails is actuated. The actuation of these bails then causes typing element 3 to turn so that the letter "x" faces the paper. Immediately thereafter, typing element 3 is pressed against the paper, and the letter "x" is printed. Correspondingly, the actuation of various other combinations of selecting bails prints the other 43 characters.

Figure 2:
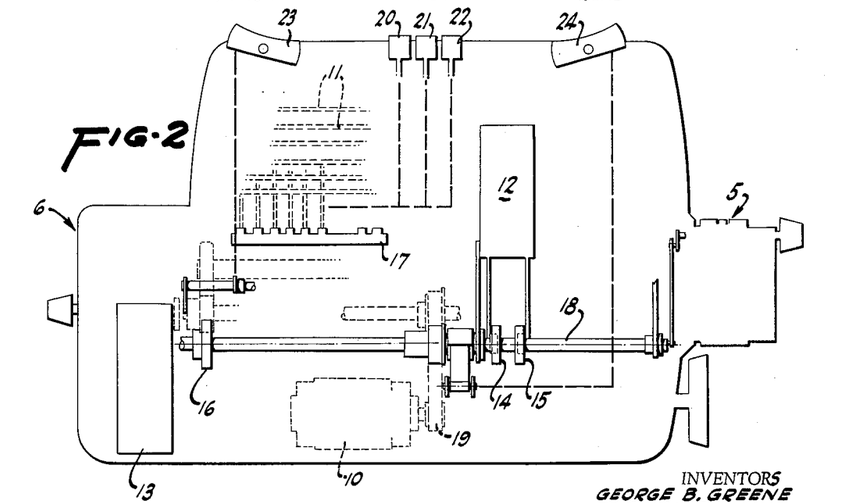
FIG. 2 is a bottom plan view of the typewriter of FIG. 1.

Referring to FIG. 2, the arrangement of the apparatus of this invention on the typewriter is shown. However, the details of the operation of each part are saved for later in the specification. The apparatus added by the invention for automatic operation is shown in solid lines; those elements shown by dotted lines represent parts conventionally found in the "Selectric" typewriter, such as a motor, the selecting bails, etc.

Two actuating mechanisms are used in the invention. The first, the selecting bail-actuating mechanism, is housed in selecting bail-actuating mechanism housing 12. This selecting bail-actuating mechanism is driven by two cams 14 and 15. Cam 14 drives one part of the actuating mechanism, and cam 15 another. A second, the punch-actuating mechanism, is housed in housing 13 and is driven by cam 16. When the typewriter is used for punching a tape, the selecting bails 11 on the typewriter actuate punch-selecting mechanism 17. The tape is moved through reader 5 by the rotation of shaft 18 by motor 10 via belt 19. Buttons 20 and 21 are used to cause the non-typewriter operations—FEED AND ERASE—and button 22 is used to punch the COMMAND code for "STOP" in the tape. Switches 23 and 24 are employed to actuate punch and/or read portions of the apparatus either individually or in combination.

Figures 3, 4:
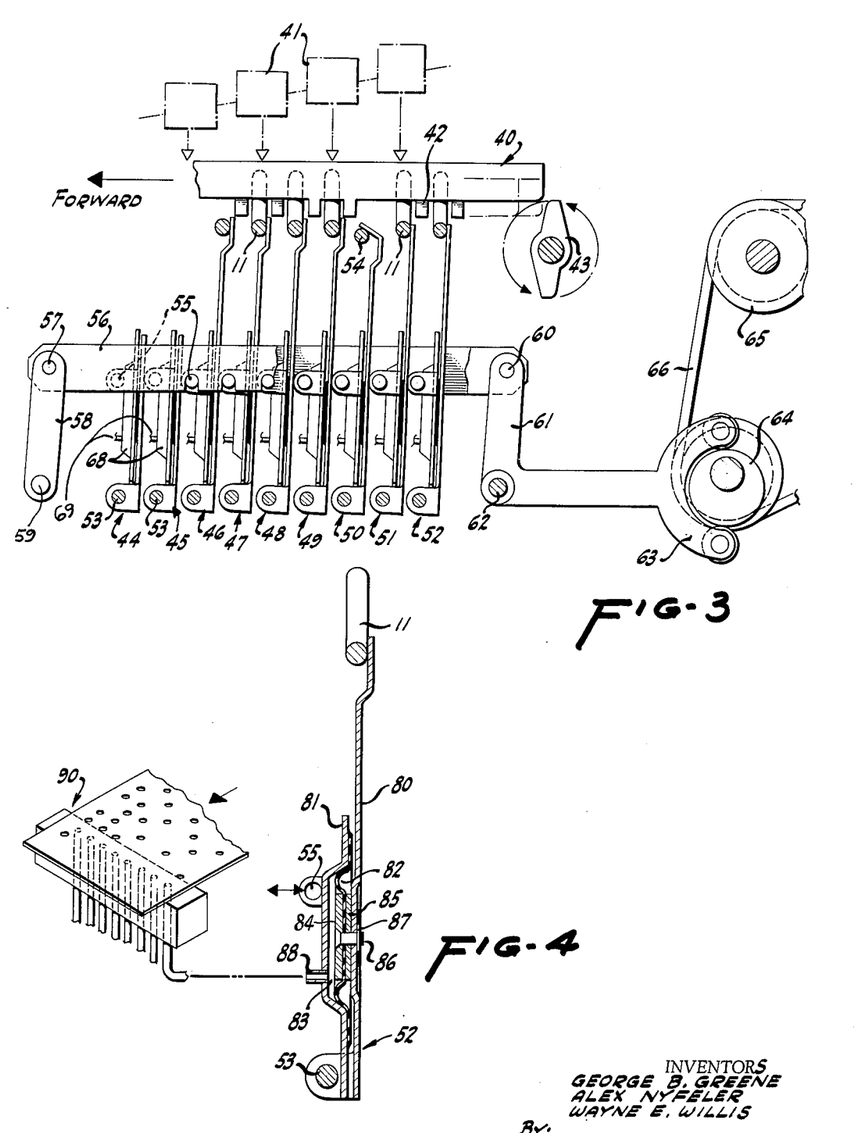
FIG. 3 is a transverse section taken along the line 3—3 of FIG. 1.
FIG. 4 is a sectional view through a single hinge and the typewriter bail with which it engages, and includes a schematic representation of the connection of this hinge to a tape reader.

FIG. 3 is a detailed view of the selecting bail-actuating mechanism, showing its engagement with selecting bails 11 of the typewriter. Referring to FIG. 3, the selecting bail comb 40 and the selecting bails 11 are parts of the typewriter itself. For manual operation, one of the keys 41 of the typewriter is depressed, and depresses its own individual selecting bail comb 40. Each comb has a bail-operating projection or projections 42 which causes the forward motion of certain ones of selecting bails 11. Half-turn cycle clutch 43 is tripped by the depressed key and brings the depressed selecting bail comb 40 forward, as shown by its dotted outline in FIG. 3. Any of the bails which engage a bail-operating projection 42 of comb 40 are moved forward, bringing about the selection of the desired character, which then prints in a manner well known in the art.

During automatic operation of the typewriter by the apparatus of this invention, hinges 46 through 52, rather than combs 40, actuate the selecting bails. These hinges are hinged about pivots 53. A first side of each of hinges 46, 47, 48, 49, 51, and 52 engages with its respective typewriter selecting bail 11. A first side of hinge 50 engages with typewriter start bail 54. The second sides of hinges 44–52 are attached by pivots 55 to a reciprocating shaft 56. This shaft is pivoted at pivot 57 to a lever 58 which in turn is pivoted at pivot 59. The other end of the reciprocating shaft 56 is pivoted at pivot 60 to a cam follower bellcrank 61. This bellcrank is pivoted at pivot 62 and is formed integrally with cam follower 63 which follows reader cam 64. One-turn clutch 65 is caused to rotate its one turn for each character code read from the tape. Clutch 65 causes reader cam 64 to make one rotation each time the tape moves. During one rotation of reader cam 64, reciprocating shaft 56 is pushed to the left and returned by the reader cam. During the forward excursion of reciprocating shaft 56, all of the second sides of hinges 44–52 which are attached to the reciprocating shaft 56 are caused to move forward along with it.

Each hinge is provided with an expandable, sealable closure 68, which is sealed by sealing its port 69. With a closure sealed, both sides of the hinge are held securely together by a vacuum which develops when the closure expands slightly as the second sides of the hinges are pulled forward by the reciprocating shaft 56. The first sides of any of hinges 46–52 which have their ports thus sealed will move forward along with their corresponding second sides. These pivoting first sides will move their corresponding selecting bails. Therefore, by applying a seal to the proper combination of hinges 46–52, any desired character of the typewriter keyboard is automatically printed in exactly the same manner as if one of the keys 41 had been struck.

Hinge 50 has a particular operation. This hinge operates typewriter start bail 54. Even though the selecting bails 11 are actuated by the hinges, the typing element will not move into position or print unless the start bail 54 is also actuated. Therefore hinge 50 is always sealed in order to actuate the start bail when a TYPE operation is desired.

Hinges 44 and 45 are used in the operation control apparatus. They are located with the rest of the hinges, and are exactly the same, except that their first sides do not engage any of the bails of the typewriter. Instead, the first sides of hinges 44 and 45 are fixed to the typewriter. If the ports of these hinges are sealed, the expandable closures expand to the full extent of the motion of their second sides (their first sides being fixed). A vacuum develops in their expandable closures as reciprocating shaft 56 moves forward. But if their ports are not sealed, however, no such vacuum can develop. This vacuum is used as a signal to operate the control apparatus, as will be explained later.

FIG. 4 shows a detailed view of one hinge 52. The first side 80 of that hinge engages typewriter selecting bail 11. The second side 81 is connected to the reciprocating shaft as shown in FIG. 3. A flexible, non-porous diaphragm member 82 is fixed, as shown, to the inside of the second side 81 of the hinge. A space remains between diaphragm member 82 and second side 81 which forms the sealable closure or air-tight chamber 83. Two metal disks 84 and 85 surround diaphragm member 82, forming a sandwich structure. A rivet 86 passes through the sandwich and through the first side 80 of hinge 52. It is snapped tight on the outside of first side 80 by snap-ring 87. Port 88 extends into closure 83. When port 88 is sealed, and second side 81 is pivoted to the left by the reciprocating shaft, the slight vacuum which develops as the closure expands slightly holds second side 81 to first side 80. First side 80, therefore, is pivoted along with second side 81, and the typewriter selecting bail 11 is actuated. On the other hand, when port 88 is open and second side 81 is pivoted to the left, the expansion of closure 83 allows second side 81 to be pivoted without moving first side 80. The restoring springs attached to the typewriter bails are sufficient to hold first side 80 in place when the closure is not sealed.

The control apparatus of this invention is unique. It selects a typewriter or a non-typewriter operation; then chooses between a TYPE and a COMMAND operation, such as SPACE, BACKSPACE, STOP, CARRIAGE RETURN, INDEX, UPPER CASE, LOWER CASE, or TABULATE. If a TYPE operation is desired, a seal is selectively applied to some of the hinges 46 through 52 (FIG. 3), always including start hinge 50. If a COMMAND operation is required, a signal is transmitted by the control apparatus to conventional servo-mechanisms which carry out the desired operation.

Figure 5:
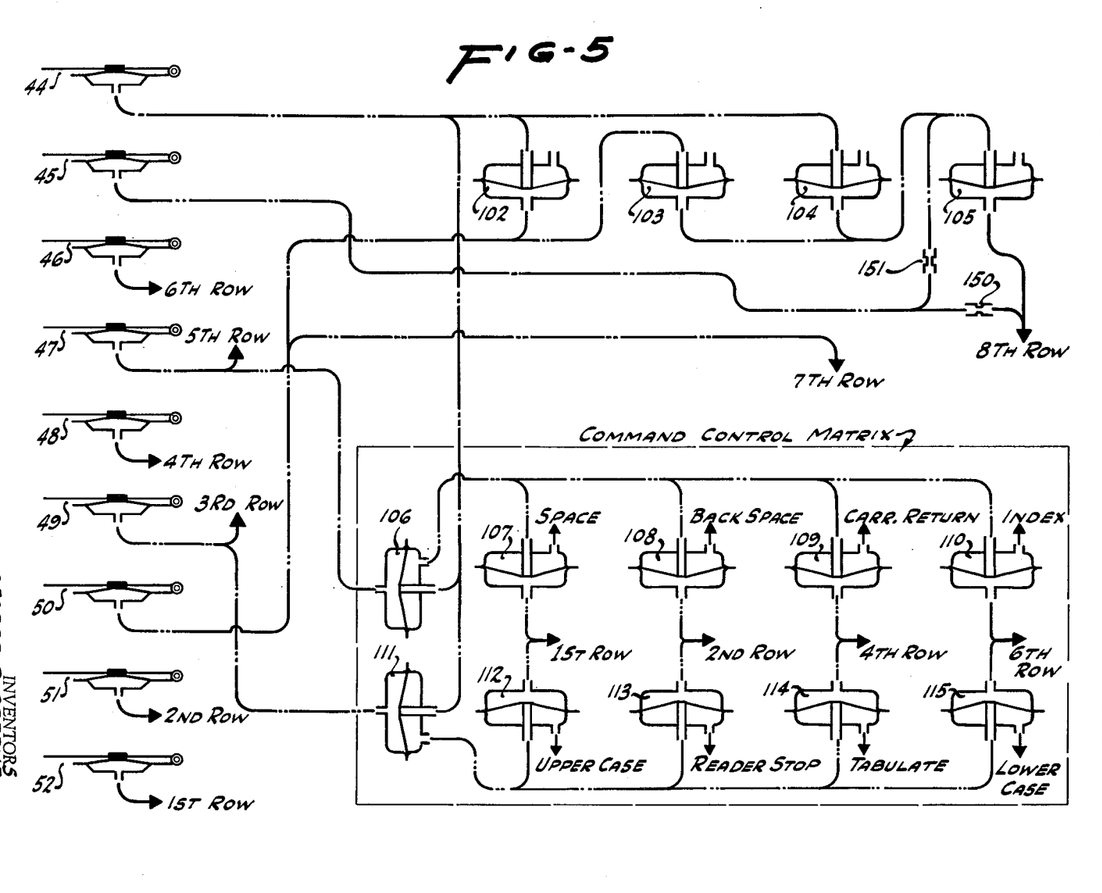
FIG. 5 is a schematic diagram of a preferred embodiment of the control apparatus having 14 switches.

The control apparatus of a preferred embodiment of the invention is shown in FIG. 5. Referring to FIG. 5, the evacuatable closures are shown schematically; the numbers on each closure correspond to the number of its associated hinge in FIG. 3. Also shown are 14 switches, 102–115. In order to fully understand the operation of the control apparatus shown in FIG. 5, an explanation of the operation of the switches is helpful. The details of one switch are shown in FIG. 6.

Figure 6:
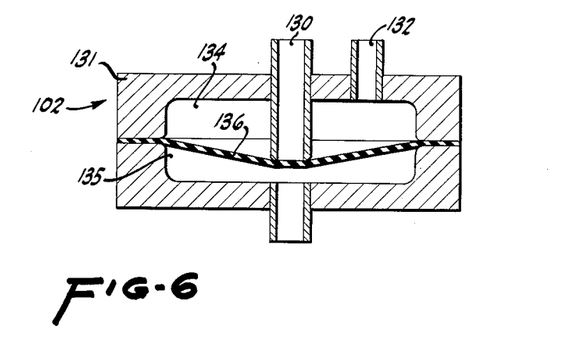
FIG. 6 is a sectional view through a single switch.

Referring to FIG. 6, switch 102 has three ports: the first is an output port 130, consisting of a thin-walled metallic tube whose lower end extends slightly past the cetner of a cavity in a hollow housing 131; the second is an input port 132; and the third is a control port 133. Housing 131 is sealed except for these ports, and is divided into two portions, an upper cavity portion 134 and a lower cavity portion 135. These portions are usually coaxial with output port 130. The portions are often separately constructed and bolted right together with flexible non-porous diaphragm 136 between them.

The condition of the switches is controlled by relative pressures. When the pressure in upper portion 134 of housing 131 exceeds the pressure in lower portion 135 by a sufficient amount, diaphragm 136 is stretched and pulled away from the opening of output port 130. The switch is then open and there is a direct connection between input port 132 and output port 130 through the upper cavity portion 134 of housing 131. The requisite pressure differential depends upon the initial stretch of the diaphragm, its elastic modulus, its thickness, size, and so forth. When the pressure differential is insufficient to free diaphragm 136 from output port 130, the output port remains sealed. The opening and closing of the switch is controlled as follows: to open the switch, a vacuum is applied to control port 133; this connects input port 132 to output port 130. To close it, control port 133 is opened to the atmosphere; this seals output port 130 with diaphragm 136.

Now referring back to FIG. 5, switches 102–105 are used to interpret the 7th and 8th rows of the tape in order to determine: (1) if the operation to be performed is a typewriter operation (TYPE or COMMAND) or a non-typewriter operation (ERASE or FEED); and (2) if a typewriter operation, whether it is a TYPE or COMMAND operation. If a typewriter operation is indicated, switches 102–105 cause a vacuum signal to be transmitted from hinge 44 to the COMMAND control switching matrix for a COMMAND operation. For a TYPE operation, no signal is sent to the COMMAND control matrix, and hinge 50 operates the typewriter start bail. On the other hand, if the operation is a non-typewriter operation, switches 102–105 transmit no signal.

Switches 102–105 are connected with the 7th and 8th row reading ports, as shown in FIG. 5. The tape actually determines, in part, whether certain switches will be open or closed, i.e., whether their control ports will be exposed to the atmosphere or to a vacuum. Whenever there is a hole in the tape, the reading port in that row is open to the atmosphere. When there is a blank in the tape, the tape itself seals the reading port. Vacuum-transmitting hinge 45 is connected: (1) to the 8th row reading port and to the control port of switch 105 through constriction 150; and (2) to the output port of switch 105 through constriction 151. Whenever there is a hole at the 8th row reader port, the control port of switch 105 is open to the atmosphere, and therefore the switch is closed. Constrictions 150 and 151 act as inverters. Although the 8th row port is open to the atmosphere, the sides of constrictions 150 and 151 away from the 8th row port will have a pressure considerably below atmospheric when hinge 45 sends a vacuum signal. Since switch 105 is closed, this reduced pressure is applied to the control ports of switches 103 and 104. These switches are therefore opened. The input ports of switches 102–105 are open to the atmosphere so that when they are opened, their output ports are also open to the atmosphere. Hinges 50 and 44 are connected to the ouput ports of switches 103 and 104, respectively. With an 8th row hole, the ports of these hinges are open to the atmosphere. Hinge 44 cannot then send a vacuum signal to the COMMAND control matrix, nor can hinge 50 actuate the typewriter start bail. Thus, an 8th row hole does not permit any typewriter operation (TYPE or COMMAND) to be performed. It indicates a non-typewriter operation.

Conversely, when there is a blank in the 8th row and that reader port is sealed, switch 105 is open (a vacuum at its control port). The control ports of switches 103 and 104 are exposed to the atmosphere through the input port of open switch 105, and they are closed. With this setting, a typewriter operation is performed; whether this operation is a TYPE or COMMAND operation depends upon whether there is a hole or blank in the 7th row of the tape.

Assuming a blank in the 8th row (indicating a typewriter operation), a blank in the 7th row (the 7th row reading port is sealed) causes two things to occur: first, a vacuum signal is applied to the control port of switch 102 by hinge 50. This opens the switch, exposes the port of powering hinge 44 to the atmosphere, and thus cuts off power from the COMMAND control switch matrix. Second, the first side of hinge 50 is pivoted along with its second side. This actuates the typewriter start bail and causes the typewriter to print a character corresponding to the punches in rows 1–6 of the tape.

A hole in the 7th row (again assuming a blank in the 8th row), exposes the port of hinge 50 to the atmosphere, and the typewriter start bail is not actuated. Even though the selecting bails will move, a character will not be printed without the actuation of the start bail. Furthermore, switch 102 remains closed because its control port is exposed to the atmosphere through the seventh row hole. The vacuum power signal from hinge 44 is transmitted through switch 102 to power the COM- MAND control switch matrix so that the desired COMMAND can be performed. The punches in rows 1–6 of the tape determine which COMMAND is desired.

Summarizing, a blank reading in both the 7th and 8th rows means the typewriter start bail is actuated by hinge 50, and a TYPE operation results. A hole in the 7th row combined with a blank in the 8th powers the COMMAND control switch matrix, and a COMMAND operation results. A hole in the 8th row, irrespective of the 7th row reading, results in a non-typewriter operation.

The command control switch matrix has two master command control switches and eight individual command control switches in a biquaternary arrangement. The control ports of the two master command control switches, 106 and 111, are connected to the output ports of hinges 47 and 49, respectively, and to the 5th and 3rd row reading ports of the tape reader, respectively. The input port of each of these master command control switches is connected to the output ports of four individual command control switches. A vacuum signal to one of the master command control switches selects the desired row of individual command control switches; a vacuum signal to one of the individual command control switches in that row selects the specific desired COMMAND. The control ports of individual command control switches 107 and 112 are connected to the first row reading port; the control ports of individual command control switches 108 and 113 are connected to the second row reading port; the control ports of individual command control switches 109 and 114 are connected to the fourth row reading port; and the control ports of individual command control switches 110 and 115 are connected to the sixth row reading port. The input of each of the individual command control switches is connected to a servo-mechanism which causes the typewriter to perform the COMMAND indicated on FIG. 5. The COMMAND codes are listed in the following chart.

*Command codes*

| Row | Tape Punches* | | | | | | | |
|---|---|---|---|---|---|---|---|---|
| | 1 | 2 | 3 | 4 | 5 | 6 | 7 | 8 |
| COMMAND: | | | | | | | | |
| SPACE | X | O | O | O | X | O | O | X |
| BACKSPACE | O | X | O | O | X | O | O | X |
| CARRIAGE RETURN | O | O | O | X | X | O | O | X |
| INDEX | O | O | O | O | X | X | O | X |
| UPPER CASE | X | O | X | O | O | O | O | X |
| LOWER CASE | O | X | X | O | O | O | O | X |
| TABULATE | O | O | X | X | O | O | O | X |
| READER STOP | O | X | X | O | O | O | O | X |

*X=Blank; O=Hole.

Referring again to FIG. 5, rows 5 and 3 of the tape control the operation of master command control switches 106 and 111. The first four commands — SPACE, BACKSPACE, CARRIAGE RETURN, and INDEX — all have blanks in row 5 and holes in row 3; the second four commands—UPPER CASE, LOWER CASE, TABULATE, and READER STOP—all have holes in row 5 and blanks in row 3. Since the first four commands have blanks in row 5, a vacuum signal is sent to the control port of master command control switch 106 by the action of hinge 47. This opens the switch, sending on the vacuum power signal from hinge 44 through master command control switch 106 to the output of each of the individual command control switches, 107–110. For example, if the desired command is a SPACE, a blank appears in row 1. Then hinge 52 sends a vacuum power signal to the control ports of command control switches 107 and 112 simultaneously, thus opening these switches. However, there is no vacuum applied to the output of individual command control switch 112 because master command control switch 111 is still closed (hole in row 3). The output of open switch 107, however, does receive a vacuum power signal from open master command control switch 106. The SPACE-actuating servo-mechanism connected to the input of switch 107 is then powered, and the typewriter spaces. At the same time, master command control switch 111 remains closed, so individual command control switches 112–115 also remain inactive. Similarly, holes in rows 2, 4, and 6 close switches 108, 109, and 110, and thus no power is transmitted to any servo mechanism except SPACE. If another COMMAND is desired, it is signaled in the same manner, according to the arrangement of holes in rows 1–6 of the tape (which will be one of the eight COMMAND codes shown above). Of course, when other auxiliary COMMANDS are desired, such as PARAGRAPH, PAPER FEED, etc., additional switches can be added to the matrix and signalled by the use of additional COMMAND codes.

Figure 7:
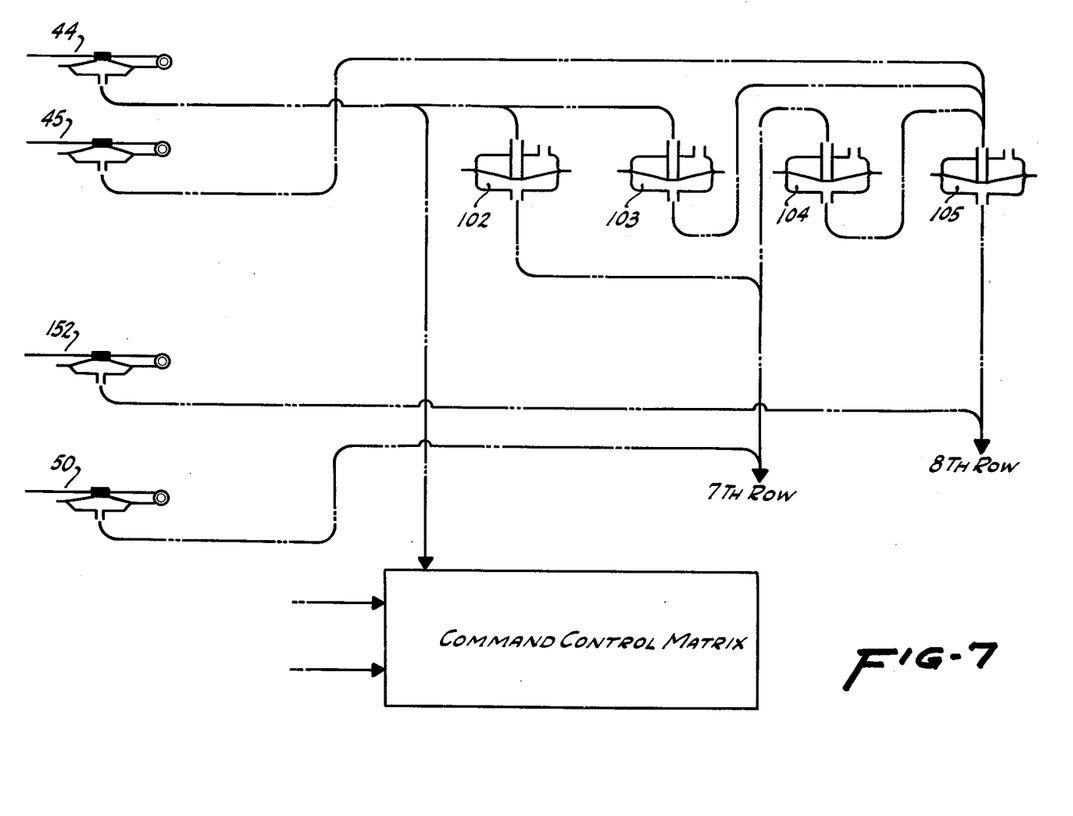
FIG. 7 is a schematic diagram showing a variation of the preferred operation selecting portion of the control apparatus of FIG. 5.

A variation on the preferred embodiment of the control apparatus shown in FIG. 5 is shown in FIG. 7. Except for a change in the interconnections between the operation-selecting switches 102–105, and the addition of an extra vacuum signal-transmitting hinge 152, this variation is the same as the embodiment shown in FIG. 5; it eliminates the need for constructions 150 and 151, shown in FIG. 5. The operation of this variation is as follows:

An 8th row hole again indicates a non-typewriter operation. The control port of switch 105 is then open to the atmosphere through the 8th row hole and the switch is thus closed. The vacuum signal from hinge 45 then opens switches 104 and 103. With these switches open, no vacuum signal can be sent either to the typewriter start bail, actuating hinge 50, or to the COMMAND control matrix because the output ports of switches 104 and 103 are open to the atmosphere through their open input ports, as described earlier. Irrespective of whether the 7th row of the tape has a hole or a blank, no typewriter operation takes place.

An 8th row blank, on the other hand, allows the additional hinge 152 to open switch 105. Switches 104 and 103 are then closed because their control ports are open to the atmosphere through the output and input ports of switch 105. If the 7th row is blank, switch 102 is opened by the vacuum signal from hinge 50, thus preventing the vacuum signal from hinge 44 from being transmitted to the COMMAND control matrix. But a signal is sent to the typewriter start bail actuating hinge 50 and a TYPE operation is carried out. If there is a 7th row hole, however, hinge 50 is opened to the atmosphere through the hole and the typewriter start bail is not actuated. But, switch 102 is then closed along with switch 103 so that the vacuum signal from hinge 44 is sent uninterrupted to the command control matrix to designate a COMMAND operation.

Figure 8:
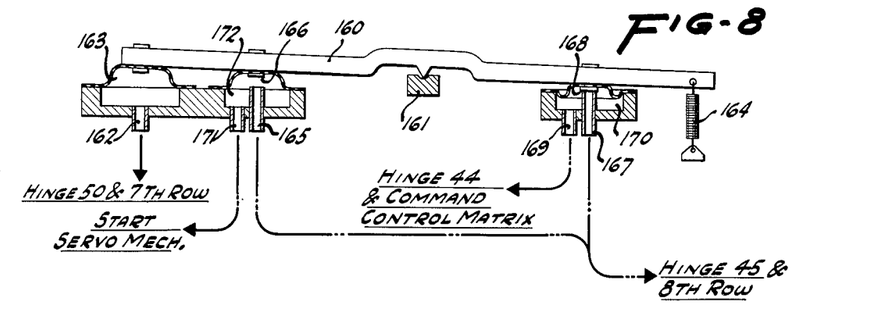
FIG. 8 is a schematic diagram of another embodiment of the operation selecting portion of the control apparatus of FIG. 5.

In another embodiment of the invention, operation control switches 102, 103, 104, and 105, shown in FIG. 5, can be replaced by a rocker arm structure shown in FIG. 8. The remainder of the elements shown in FIG. 5 are the same, with one exception. Referring briefly to FIG. 2, it will be recalled that cam 14 drives one part of the activating mechanism, and cam 15 another part. In this embodiment, cam 14 controls the operation of hinges 44, 45, 46, 47, 48, 49, 51, and 52, while cam 15 controls the operation of the rocker arm. In the previous embodiment, cams 14 and 15 were driven in phase by shaft 18. In this embodiment, however, cam 15, driving the rocker arm, is timed well in advance of cam 14. This compensates for the slight inertial delay in the rocking of the rocker arm.

Referring now to FIG. 8, rocker arm 160 is free to rock on pivot 161. When a vacuum is applied to port 162, a rocking means, such as a bellows 163, is compressed and the left-hand end of rocker arm 160 is pulled down, so that spring 164 is extended and tube 165 is sealed by membrane 166. This position is not illustrated. Tube 167, on the right of pivot 161, is separated from membrane 168 and is therefore connected to tube 169 through chamber 170. In the position shown in FIG. 8, with no vacuum applied to bellows 163, the rocker arm has its right end down and spring 164 is relaxed. Tube 165 is removed from contact with membrance 166; it is, therefore, connected with tube 171 through chamber 172. Conversely, tube 167 is sealed by membrance 168.

With this embodiment (as with the last embodiment), when there is an 8th row hole, no typewriter operation can be carried out because one of the tubes (165 or 167) is not sealed by its membrance (166 or 168, respectively), and is open to the atmosphere via the 8th row reading port (now a hole). Consequently, no vacuum signal can be sent through tube 169 to the command control matrix or through tube 171 to the typewriter start servo-mechanism.

The 7th row still determines whether a TYPE or a COMMAND operation is required. In this embodiment, however, the mode of operation of the 7th row is reversed—a 7th row hole causes a TYPE operation, and a 7th row blank causes a COMMAND operation (blanks, not holes, would appear in the 7th row in the COMMAND code table). When there is a 7th row blank, bellows 163 is compressed, the left side of rocker arm 160 is down, and membrane 166 seals tube 165 (rendering the start servo-mechanism inoperative). Also, tube 169 is connected to tube 167 through chamber 170. Assuming an 8th row blank, a vacuum signal is then sent by hinge 45 through tube 167, through chamber 170, and tube 169, to the command control matrix to select a COMMAND in the same manner as in the previous embodiment. If there is a 7th row hole, on the other hand, bellows 163 is relaxed, tube 167 is sealed by diaphragm 168, and tube 171 is connected to tube 165 through chamber 172. Again assuming an 8th row blank, the vacuum signal from hinge 45 passes through tube 165, chamber 172, and the start servo-mechanism. The typewriter then starts, and shortly thereafter the proper character, designated by the hole patten in rows 1–6 of the tape, is printed.

Summarizing, for this embodiment, an 8th row hole produces a non-typewriter operation; an 8th row blank and a 7th row hole produce a TYPE operation; and blanks in both the 7th and 8th rows produce a COMMAND operation.

Figure 15:
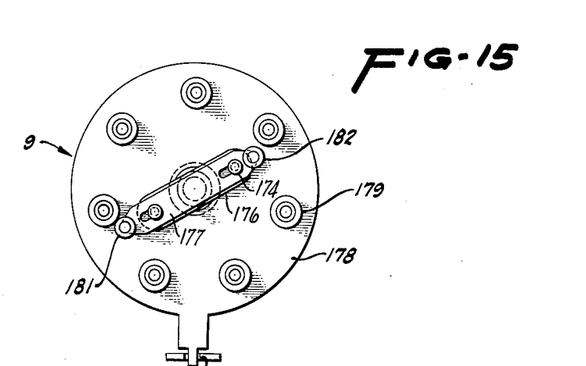
FIG. 15 is an end view of a velocity controlled switch employed in the invention.
Figures 16, 17:
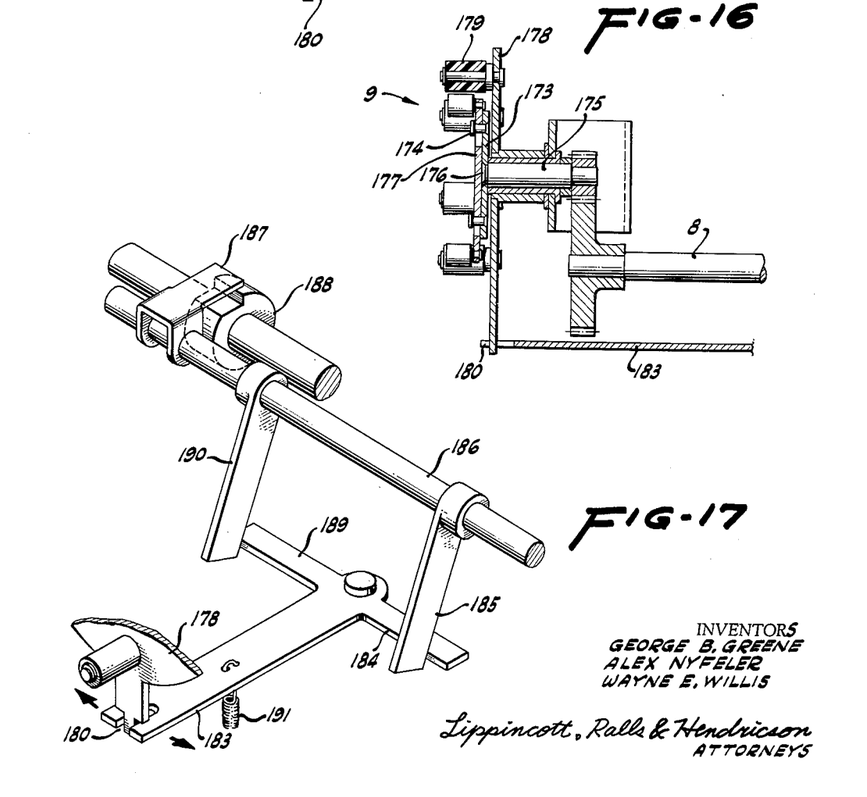
FIG. 16 is a sectional view taken on the axis of the switch of FIG. 15.
FIG. 17 is a perspective view of T-bar mechanism operated by the switch of FIGS. 15 and 16 to provide requisite time delay for TABULATE and CARRIAGE RETURN operations.

It is extremely important, during the CARRIAGE RETURN and TABULATE operations which require a longer-than-usual time, that the tape reader be delayed long enough to permit the completion of these operations. During these operations, the typing element is moved across the typewriter by a pulley 7 and pulley shaft 8 shown in FIG. 1. This shaft rotates counter-clockwise when the typing element moves in one direction, and clockwise when the typing element moves in the other direction. The velocity of rotation of the shaft is considerably faster for the long-duration movements (CARRIAGE RETURN and TABULATE) than it is for a short-duration movement (such as SPACE). The apparatus of this invention takes advantage of this velocity differential by using a novel velocity-controlled switch 9 shown in FIG. 1 and shown in detail in FIGS. 15, 16 and 17. Referring now to these figures bar 173, having extensions 174, is affixed to the aforementioned pulley shaft 175 by rivet 176. This bar 173 therefore rotates at the same velocity as the pulley shaft. A second bar 177 is slidably mounted on the first bar, as shown, by extensions 174. It also rotates at the same velocity as shaft 175. Referring to FIGS. 15 and 16, a wheel 178 is rotatably mounted on shaft 175. This wheel has a plurality of stops 179 (preferably 7) and a tongue 180. The second bar 177 is slightly longer than the radial distance between the inside portions of stops 179; consequently, bar 177 cannot rotate without one of its ends 181 or 182 impinging on the inner portion of one of said stops 179. When this occurs, bar 177 is forced to slide on bar 173, in order to allow it to pass the stop. As it slides, its other end extends between the opposite stops. Equidistant spacing of seven stops, as shown, always leaves a space diametrically opposite from each stop. Then, as rotation continues, the other end of bar 177 will hit a stop on the opposite side and slide the bar back. However, no matter which end hits a stop, the torque applied to wheel 178 will be in the same direction. This direction is reversed only when the direction of rotation of shaft 175 and bars 173 and 177 is reversed. Rotation is always in one direction for a CARRIAGE RETURN operation and in the opposite direction for a TABULATE operation.

The mechanism shown in FIGS. 15 and 16 will have sufficient torque to move tongue 180 only during the TABULATE or CARRIAGE RETURN operations which cause shaft 175 to rotate faster. However, irrespective of which of these operations is occurring, the device must stop the tape reader temporarily. This is accomplished by the T-bar mechanism shown in FIG 17. Tongue 180 engages the fork 183 of the T-bar. If, for example, tongue 180 and fork 183 are moved to the left, the right side 194 of the T-bar moves rod 185 forward. This pivots shaft 186 clockwise, moving pawl 187 downward to engage clutch 188 to stop the reader. On the other hand, if tongue 180 and fork 183 move to the right, the left side 189 of the T-bar moves forward, moving rod 190 forward. This also rotates shaft 186 clockwise, and moves pawl 187 downward to engage clutch 188. As soon as the pulley shaft stops its fast rotation caused by a TABULATE or CARRIAGE RETURN operation, the torque ceases to be applied to wheel 178 (FIG. 16) and fork 183 of the T-bar is pulled back to its central location by spring 191, releasing pawl 187 from clutch 188.

The arrangement of components for the punching operation of the typewriter is shown in FIG. 2. Punch-actuating mechanism (in housing 13) punching cam 16, punch-selecting mechanism 17, selecting bails 11, and non-typewriter operation keys 20, 21 and 22, all co-operate in the tape-punching process.

Figures 9, 14:
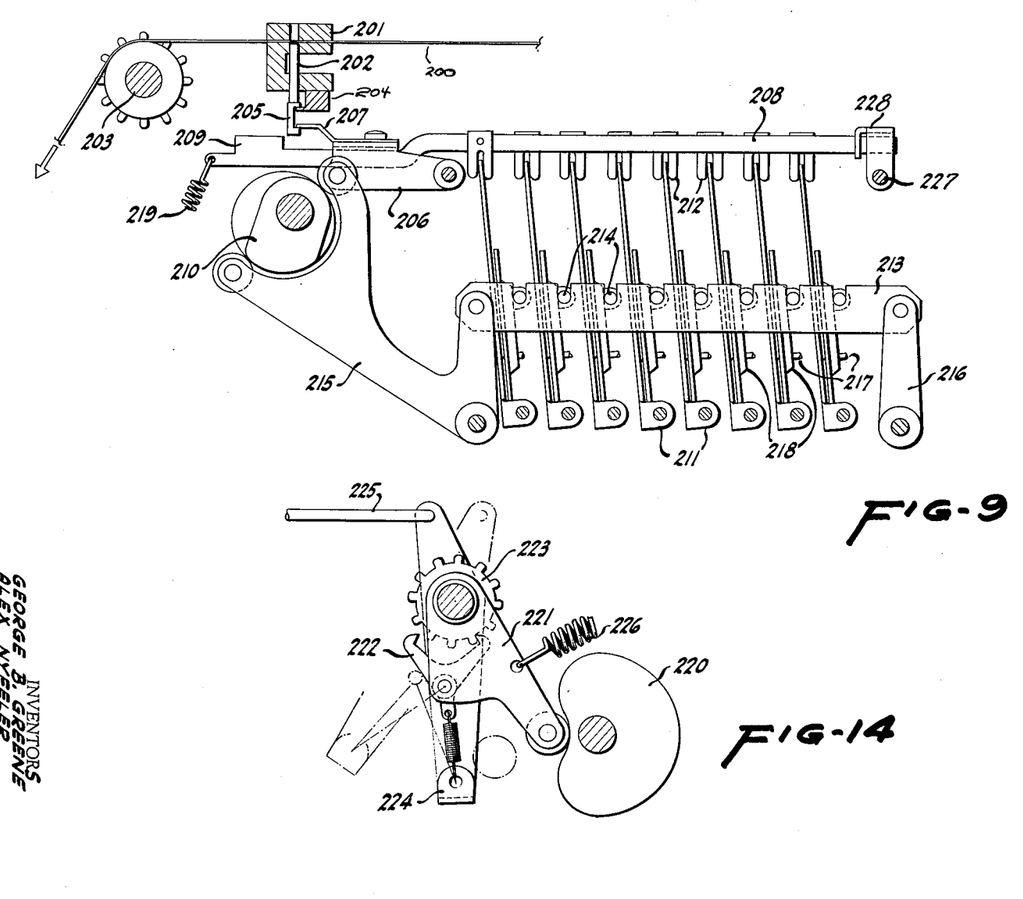
FIG. 9 is a side elevation view of a tape punch and actuating mechanism.
FIG. 14 is a side elevational view of tape advance mechanism.

The punch-actuating mechanism itself is shown in FIG. 9, wherein tape 200 passes through guide block 201 containing nine holes. Nine punches 202 fit snugly but slidably into these holes. Eight of the holes are used for punching the eight typewriter control holes, and the ninth is for punching a tape advance hole which fits preicsely onto the projections of tape-advance mechanism 203. This mechanism will be decribed in detail after the description of the punch. Punches 202 are retained in the punch guide block 201 by retainer block 204. This block 204 has a tongue for engaging the slots of punch heads 205, and is fastened securely to punch guide block 201.

A tape advance hole is punched in the tape with every punching operation. Certain of the eight other holes are also punched, the choice being governed by the punch selecting apparatus. This apparatus includes a punching bail 206 having a lip 207. Lip 207, which engages all eight punch heads 205, is firmly attached to punching bail 206, and is used to return punches 202 to their normal position after punching. The action of eight sliding interposer links 208 determines which of the eight typewriter control holes are to be punched. These interposer links have a raised portion 209. In the non-punch position, raised portion 209 of an interposer link 208 remains to the left of punch head 205, as shown in FIG. 9. When a hole is to be punched in the position corresponding to one of the interposer links 208, this link moves slightly to the right from the position shown in FIG. 9. In the new position, raised portion 209 of the interposer link is directly beneath its corresponding punch head 205.

The interposer link 208 for punching the 8th hole is reversed, relative to the others. Its raised portion 209 lies beneath its corresponding punch head 205 when it is in the left position. The 8th row, therefore, is punched in response to a signal opposite from that which causes the others to be punched.

When all eight interposer links 208 are raised by the action of counterclockwise-rotating punching cam 210, only those of the first seven interposer links 208 which have been moved to the right will cause their corresponding punches 202 to punch the tape. Contrariwise, an 8th row hole will be punched if the eighth row interposer link 208 is not moved to the right. The other interposer links will fail to engage their corresponding punch heads 205 when raised by the action of punching cam 210.

The movement of the interposer links 208 is controlled by hinges 211. These are the same kind of hinge described in connection with the tape reading portion of the apparatus. The first sides of these hinges engage vertical slots 212 of interposer links 208. The second sides are pivotally held as shown in slots of reciprocating shaft 213 by pivots 214. Reciprocating shaft 213 is pivoted at one end on a bellcrank arm 215 and at the other end on a pivot arm 216. When reciprocating shaft 213 makes its excursion to the right, all of the second sides of hinges 211 move to the right along with it. If ports 217 of any of sealable closures 218 of hinges 211 are sealed, the first sides of those hinges move to the right along with their corresponding second sides. These first sides of the hinges carry along with them their corresponding interposed links 208 and extend the tension springs 219 on those interposer links. This movement of interposer links 208 (except for row 8) causes the punch corresponding to that link to punch when all the interposer links are subsequently raised by the counterclockwise motion of punching cam 210.

When punching is completed, interposer links 208, pivoted on pivot 227, are lowered again by spring 228 as punching cam 210 continues its counterclockwise motion. At the same time, lip 207 on punching bail 206 returns the individual punches 202 to their normal positions. Any interposer links 208 which were previously moved by hinges 211 are then returned to their normal position by tension springs 219.

The tape advance mechanism is shown in FIG. 14. Tape advance cam 220 is located on the same shaft as punching cam 210 (FIG. 9). Each time the punching cam rotates, the tape advance cam 220 rotates along with it. Cam follower 221 is pivotably connected to Y-shaped pawl 222. In the position illustrated in FIG. 14, when cam 220 rotates counterclockwise and cam follower 221 is moved to the left, one arm of Y-shaped pawl 222 moves wheel 223 clockwise. When switch lever 224 is moved into the alternate position (shown dotted) by the action of punch reverse lever 225 (described later), the other arm of Y-shaped pawl 222 engages wheel 223. A counterclockwise motion of tape advance cam 220 again produces a leftward movement of cam follower 221, but in this position of pawl 222, wheel 223 is moved counterclockwise rather than clockwise. Thus, the tape is moved in the reverse direction. Cam follower 221 is held against cam 220 by retention spring 226.

Figure 10:
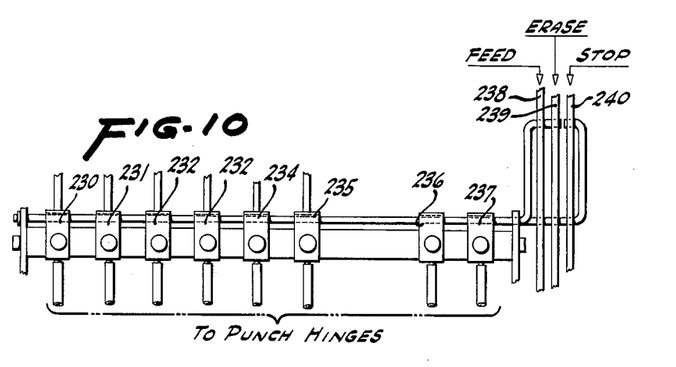
FIG. 10 is a diagram of a bank of eight punch-selecting switches and includes a schematic representation of the connection of the manual non-typewriter operation controls to the punch-selecting switches.

The holes to be punched on the tape are selected by signals sent to sealable closures 218 of hinges 211. These signals are sent by punch-selecting switches, such as the eight shown in FIG. 10. Referring to FIG. 10, eight punch-selecting switches 230–237 are arranged in a bank. Connections to feed key 238, erase key 239, and stop key 240 are shown schematically. Punch-selecting switches 236 and 237 are for controlling the punching of rows 7 and 8 to determine whether the coded operation is a non-typewriter operation, a TYPE operation, or a COMMAND operation. For a TYPE operation, six punch-selecting switches 230-235 control the punching of the first six rows of the tape, which designate the character typed. For the COMMAND codes, five other punch-selecting switches (not shown) are also used. These are exactly the same as the eight shown. They control the punching of five of the first six rows of the tape which designate the COMMAND executed.

Figure 11:
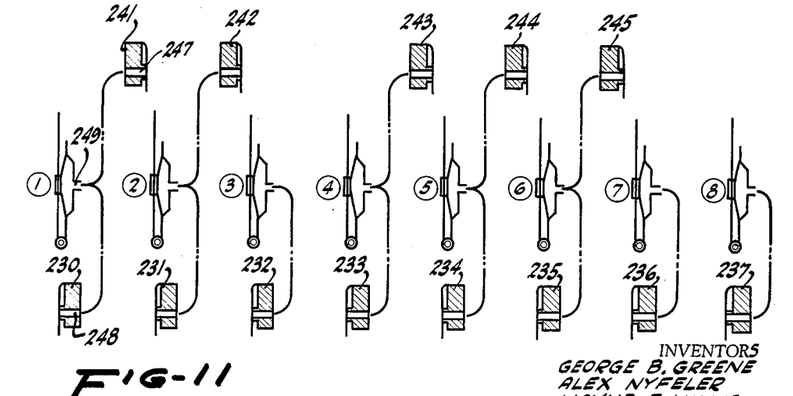
FIG. 11 is a schematic diagram of the punch-selecting system.

The interconnections of the punch-selecting system are shown schematically in FIG. 11. Referring to FIG. 11, the eight hinges 211 (shown in FIG. 9) are shown. The circled numbers indicate the row of the tape-punch with which each hinge is associated. The bank of eight punch-selecting switches 230–237 and the bank of five punch-selecting switches 241–245 are shown connected to their respective sealable closures.

Figure 12:
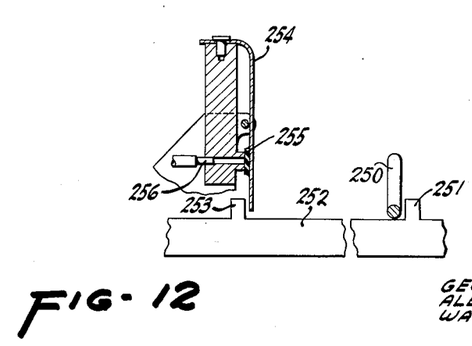
FIG. 12 is a schematic side elevation view of a punch-selecting switch engaged with a selecting bail of the typewriter in order to select the proper holes to be punched in rows 1–6 of the tape.

During a TYPE operation, the port of punch-selecting switches 241–245 are all closed. The desired punching in rows 1–6 of the tape is determined by punch-selecting switches 230–235. Referring to FIGS. 11 and 12, punch-selecting switches 230–235 are controlled by the typewriter selecting bails 250 (part of the typewriter) which engage projection 251 of bail coupling link 252. Bail coupling link 252 is moved to the right by the bail. This causes the other bail coupling link projection 253 to move the lower end of spring 254 to the right, thus separating it from tube 256. Pad 255 is made of a resilient material and is attached to spring 254. Tube 256 is sealed by pad 255 in the position shown. It is open to the atmosphere when spring 254 is moved away. In addition, during a TYPE operation (with the preferred embodiment of the control system) the typewriter start bail causes the spring 254 of the punch-selecting switch 236 to move away so that there is a blank placed in row 7 of the tape—indicating a TYPE operation.

Figure 13:
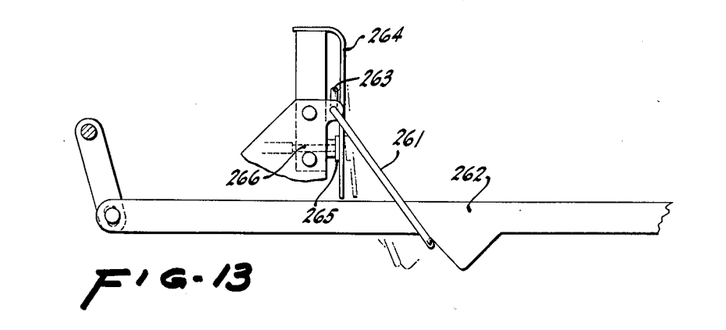
FIG. 13 is a schematic side elevation of a switch engaged with a non-typewriter operation key in order to select the proper holes to be punched to designate a COMMAND or a non-typewriter operation.

When one of the COMMAND operations is carried out on the typewriter, punching is governed in a different way. Referring to FIG. 13, the punch-selecting switch shown is identical to the one in FIG. 12, except that the one shown in FIG. 13 has a valve-lifting crank 261. This crank may be moved by one of the non-typewriter operation control keys, or by one of the COMMAND keys (or its associated servo-mechanism). When such a key 262 is moved to the left, valve-lifting crank 261 pivots clockwise. The tip 263 of valve-lifting crank 261 then engages spring 264 and moves it and pad 265 away from tube 266. Tube 266 is thus opened to the atmosphere in exactly the same manner as was done by the typewriter bail in FIG. 12. The eight punch-selecting switches are arranged in a row, as shown in FIG. 10. One crank 261 may have multiple tips 263, each beneath a different punch-selecting switch. When this crank is pivoted, the ports of all those punch-selecting switches are opened simultaneously.

The eight possible COMMANDS are punched as they are executed by the typewriter. One cycle of punching is initiated by each such executed COMMAND. For four COMMANDS (SPACE, BACKSPACE, CARRIAGE RETURN and INDEX), punching is controlled completely by punch-selecting switches 241–245 (FIG. 11). The ports of punch-selecting switches 230–237 are all closed so that, unless the ports of punch-selecting switches 241–245 are open, holes are punched in rows 1–7 and a space in row 8 (since the punching of row 8 is reversed from the others). For example, suppose the space bar is depressed. Referring back to the COMMAND code table, blanks are required in the 1st, 5th, and 8th rows. Therefore punch-selecting switches 241 and 244 must prevent holes from being punched in rows 1 and 5. Therefore they must be opened. Whenever either the space bar, the backspace key, the carriage return button, or the index key are depressed, the resulting operation of the typewriter causes the port of punch-selecting switch 244 to be opened. This places a blank in row 5, as is required for all four of the above commands. A servo-mechanism connected directly to the space bar opens the port of punch-selecting switch 241, which causes the 1st row blank. Similarly, servo-mechanisms attached directly to the backspace key, the carriage return button, and the index key are directly connected to punch-selecting switches 242, 243, and 245, respectively, to open the ports of those switches and cause blanks in the rows designated in the COMMAND code table for those particular operations.

The sequence of events for a shift operation is slightly different. Of necessity, the decision between LOWER CASE and UPPER CASE must be made before each key is typed. These COMMANDS will cause the typewriter to type the case indicated and continue to do so until the opposite COMMAND is given. When the shift key is either depressed or released, a lockout mechanism within the typewriter prevents the typewriter from printing until the typing element is first set for the proper case. During he operation of this lockout mechanism, one cycle of punching occurs to designate the case. Referring to FIG. 11, during this punching cycle, irrespective of whether the shift key was depressed or released, the port of punch-selecting switch 232 is opened by a servo-mechanism which moves the crank 261 (shown in FIG. 13) associated with that switch. This places a blank in row 3 (required for both UPPER CASE and LOWER CASE, as shown in the COMMAND code table). If the shift key was depressed, then a servo-mechanism connected to punch-selecting switch 241 opens the port of that switch, thereby putting a blank in row 1 (as required by the UPPER CASE code). On the other hand, where the shift key was released, a servo-mechanism connected to switch 245 opens the port of that switch and causes the required blank to be placed in row 6 (as required for the LOWER CASE code).

The TABULATE key has an associated crank 261 (FIG. 13) which has ends 263 beneath the springs 264 of punch-selecting switches 232 and 233 (FIG. 11). Thus, when the TABULATE key is depressed, the ports of punch-selecting switches 232 and 233 are opened and blanks are placed in rows 3 and 4 of the tape, as required by the COMMAND code for TABULATE. Alternatively, the TABULATE key can be connected with a servo-mechanism which directly opens punch-selecting switches 232 and 233, or alternatively, punch-selecting switches 232 and 243.

The last COMMAND is READER STOP. This COMMAND is punched whenever stop button 22 is depressed. This button is mechanically linked to a key such as key 262, shown in FIG. 13. When the button is pressed the key moves to the left, moving crank 261, which has ends 263 beneath springs 264 of punch-selecting switches 231 and 232 (FIG. 11). Therefore the COMMAND for READER STOP (blanks in rows 2, 3 and 8) is punched.

Turning to the operation of the non-typewriter operation keys, the feed key and the erase key, the feed key has a very simple operation. Punching will repeat (the same punches) until the key is released. This key (referring to FIG. 13) has a portion 262 which engages a crank 261 having an end 263 beneath the spring 264 of punch-selecting switch 237 (8th row). Consequently, when the FEED key is depressed, instead of an 8th row blank which is normally punched (recalling that the 8th row is reversed), there will be an 8th row hole to designate a non-typewriter operation. When the reader senses this, the tape will advance without causing a typewriter operation (TYPE or COMMAND) to take place. The feed key is used primarily for advancing the tape (for example, to allow enough tape to engage the tape advance wheel) without causing the typewriter to operate.

Although it would have absolutely no effect upon the operation of the typewriter, it is possible for the crank 261 not only to have an end 263 engaging with the row 8 punch-selecting switch, but also with the punch-selecting switches of rows 1–7. The only effect this has is to put blanks in rows 1–7 rather than holes. Since these rows have no effect whatsoever with an 8th row hole (as explained earlier), the advantage of having them blank rather than punched with holes is to maintain a stronger tape.

The ERASE key is a very important feature of this invention. When that key is depressed, a series of operations automatically takes place. First, the key itself opens punch-selecting switch 237 so that at the next punching there will be an 8th row hole. Second, the tape feed reverse lever (described earlier) is pulled so that when the tape is next advanced, the motion will be in the reverse direction rather than forward. The motion of this reverse lever also causes the tape to move before punching rather than after. Third, the BACKSPACE operating key is actuated, causing the typewriter to backspace once. This BACKSPACE servomechanism normally causes the tape to advance. However, now, since the reverse switch has been engaged, the advance occurs before punching and is in the reverse, rather than the forward direction. This means that the BACKSPACE code is now punched over the last punch code (presumably an error to be erased). This BACKSPACE code is the usual one except for the eighth row hole punched because punch-selecting switch 237 is now open. After the typewriter has backspaced, the series of operations is completed, the reverse lever is automatically released, and punch-selecting switch 237 is again closed.

Now the typewriter has backspaced once and is in typing position over the error. The tape has also backed up one space and has a hole punched in the 8th row of the punch code representing the character which was in error. This erroneous code is still in the punch. The typist can now type an "X" over the erroneous letter. The code for the "X" will, of course, be punched in the tape over the meaningless punching in the row already containing: (1) the erroneous code; (2) the BACKSPACE code; and (3) an 8th row hole. This does not make the slightest difference, however, for the 8th row hole prevents the typewriter from responding to this meaningless code when the reader reads it during later typing from the tape.

Summarizing, when an error is made, the typist merely depresses the ERASE key. The typewriter backspaces, the tape backs up, and an 8th row hole is punched to defeat a typewriter operation for that character. The typist can then "X" out the error with no effect upon later typing from the tape. When the tape is later read for typing, the erroneous character (now made meaningless by subsequent overpunching) is ignored because of the 8th row hole. The typewriter types the character before the error and the character after it, but not the erroneous character. For example, suppose the word "typewriter" were typed "typewtrier." The typist would depress the ERROR key five times after he struck the final "r." This would take him back to the letter "t." He would then proceed to "X" out the letters "trier," making the word on his paper look like "typewtrier."

Immediately following the final "r" (now "X'd" out), he would type "riter," making the paper look like "typewtrierriter."

However, the 8th row hole in the erroneous character code prevents the "X'd" out characters from being typed. When the typing is done from the tape, the corrected work looks like "typewriter"—exactly as desired.

The apparatus of this invention does not affect the normal operation of the typewriter. When the "read" or "punch" buttons 23 and 24 (FIG. 2) are not depressed, the typewriter performs as a normal typewriter. When the "punch" button is depressed, a tape is punched which corresponds to what is being typed on the typewriter. When the "read" button is pressed, the operation of the typewriter is completely automatic, controlled by the punches in a tape passing through the reader.

As will be apparent to one skilled in the art, many modifications may be made in the apparatus of this invention as described above without departing from the spirit and scope of the invention. Therefore the only limitations to be placed upon that scope are those specifically set forth in the claims which follow.

What is claimed is:

1. In a typewriter which operates on a coded system wherein a limited number of selecting elements of said typewriter, said number being substantially less than the number of its keys, cause said typewriter to type all the characters, apparatus for connecting a punched tape reader and a tape punch to said typewriter so that the operation of the typewriter automatically causes the tape punch to punch a pattern of holes in the tape designating the elements of the typewriter which were actuated by said operation, and the tape reader automatically causes those of the typewriter elements to operate which type a character which corresponds to the pattern of holes read in the tape by said tape reader, which comprises:
   a cam-driven, selecting element-actuating mechanism including a reciprocating shaft, a first plurality of atmospherically controlled hinge actuators each having a first side connected to said shaft and a second side extending into proximity with a selecting element, and connections from each actuator to a separate tape reader port for releasing the hinge sides from each other upon communication with the atmosphere through a tape hole at a reader port; and
   a cam-driven, punch-actuating mechanism having a plurality of punch interposers mechanically actuating individual punches, a second reciprocating shaft, a second plurality of atmospherically controlled hinge actuators each having one side connected to said second reciprocating shaft and the other side engaging one punch interposer for moving same into punch position, and selecting-element means venting individual actuators to atmosphere for controlling punches by selecting element movement.

2. Apparatus for connecting a punched tape reader and a tape punch to a typewriter so that the operation of the typewriter automatically causes the tape punch to punch a pattern of holes corresponding to the key of the typewriter which was struck and the tape reader automatically causes the typewriter to carry out a desired operation corresponding to the pattern of holes read in a tape, which comprises:
   a first plurality of two-sided hinges, the first sides of which engage with operating elements of said typewriter and cause it to carry out a selected operation when selected ones of said first sides are pivoted, and the second sides of which are capable of being held to their corresponding first sides when a seal is applied to a closure between them;
   means for pivoting all of said second sides of said first plurality of hinges simultaneously;
   selecting means for providing a seal to cause the two sides of said selected ones of said first plurality of hinges to be held together, the selection being made on the basis of information signals from said reader based upon the hole pattern read in a punched tape, thereby, when all of said second sides of said first plurality of hinges are pivoted, causing only said selected ones of said first sides of said first plurality of hinges, which cause said typewriter to carry out said selected operation, to pivot along with them;
   a second plurality of two-sided hinges, the first side of which engage with operating elements of said tape punch and cause a desired pattern or holes to be punched in a tape when selected ones of said first sides are pivoted, and the second sides of which are capable of being held to their corresponding first sides when a seal is applied to a closure between them;
   means for pivoting all of said second sides of said second plurality of hinges simultaneously; and
   selecting means for providing a seal to cause the two sides of said selected ones of said second plurality of hinges to be held together, said selection being made on the basis of information signals from said typewriter based upon which key of said typewriter is struck, thereby, when all of said second sides of said second plurality of hinges are pivoted, causing only said selected ones of said first sides of said second plurality of hinges which cause said desired pattern of holes to be punched to pivot along with them.

3. Apparatus for causing a typewriter to carry out one of a set of operations including space, backspace, carriage return, index, shift, return to lower case, reader stop, and tabulate, where said typewriter is connected to a tape reader in such a way that the reader automatically causes the typewriter to carry out a desired operation corresponding to a pattern of holes read in a tape, which comprises:
   two master air switches controlled by said tape reader so that one of said switches is opened when there is a blank in one row of said tape and the other of said switches is opened when there is a blank in another row of said tape,
   two matched pluralities of air switches, each switch of one plurality forming a pair with one switch of the other plurality,
   both switches of each of said pairs controlled by one row of said tape reader so that both switches are opened when there is a blank in the said row of the tape,
   all switches of one plurality of switches being signalled when one of said two master switches is open, and all the switches of the other plurality of switches being signalled when the other of said two master switches is open,
   any one switch of either of the pluralities of switches causing the typewriter to carry out a different one of said operations when such switch is open and signalled.

4. In combination with a typewriter having a keyboard and selecting bails operating the typewriter apparatus comprising:
   a plurality of selecting bail actuators with each having first and second sides hinged together with a resilient air-tight element joining the sides;
   means mounting said actuators for continuously oscillating the first sides of said actuators and disposing the individual second sides thereof adjacent separate selecting bails;
   a tape reader including means for transporting perforate tape across a head having ports; and
   air lines connecting separate tape head ports to separate actuators whereby a tape hole vents the actuator to unseal the sides from each other so that the bail associated with such actuator is not moved.

5. Apparatus as set forth in claim 4, wherein the typewriter is electrically energized and includes a movable start bail which causes the typing of each character established by said selector bails and further comprising:
   a start bail actuator like said selecting bail actuators having one side oscillated and the other side engaging said start bail; and
   control means including an air line from a preselected reader port connected to the start bail actuator whereby a tape hole over said preselected port prevents typing of characters.

6. The apparatus set forth in claim 5, further defined by a command control matrix of air valves operable by atmospheric air pressure at an inlet of each to control actuation of typewriter command functions and interconnected in coded relation to preselected reader ports for operation in accordance with the presence or absence of tape holes above such ports and upon venting of the start actuator through a tape hole.

7. In an automatic electric typewriter having a plurality of selecting bails which in combination establish each character to be typed, a start bail for causing typing, a continuously rotatable shaft, and means for performing command functions including backspace, the combination comprising:
- a tape reader having tape transport means moving perforate tape across a reader head with a separate port for each row of perforations;
- a selection bail-actuating mechanism having a shaft reciprocated by cam drive from said rotatable shaft and carrying one side of a plurality of hinge actuators having second sides extending into proximity with said selecting bails and sealed to said first sides for movement therewith in the absence of venting of the seal to thus move selecting bails when sealed;
- air lines connecting individual actuators of said mechanism to individual tape reader ports;
- a tape punch having tape transport means and a punch for each row of perforations to be made in tape, a shaft reciprocated by cam drive from said rotatable shaft and carrying a first side of a plurality of hinge actuators having a second side releasably sealed to the first side and extending into position for selecting individual punches, means operable by said selector bails for selectively venting the hinge actuators of the tape punch to thus select punches in accordance with selection bail position; and
- a control matrix of air valves operated from selected rows of tape holes and from typewriter command switches operatively connected to control the typewriter start bail and to initiate typewriter command functions including backspace, whereby typewriter operation and punching are selectively performed manually and by tape reading.

8. An actuator comprising:
a pair of juxtaposed plates,
means hinging said plates together so that each of said plates is individually pivotally mounted,
a resilient diaphragm between said plates having the periphery thereof secured to one of said plates and defining an air-tight chamber therewith,
means securing the other of said plates to an intermediate portion of said diaphragm,
venting means communicating with said chamber to selectively seal or vent the same to the atmosphere, and
means pivotally connected to one of said plates and reciprocating said one plate about the pivotal mounting thereof whereby the other plate is forcibly moved with the reciprocated plate only when said venting means is sealed.

References Cited by the Examiner
UNITED STATES PATENTS

| | | | |
|---|---|---|---|
| 225,136 | 3/1880 | Hottel | 116—74 |
| 260,156 | 6/1882 | Bowsher | 116—74 |
| 446,443 | 2/1891 | Gladish | 74—157 X |
| 767,312 | 8/1904 | Otis | 74—157 X |
| 2,292,701 | 8/1942 | Kloid | 197—20 |
| 2,297,789 | 10/1942 | Mills et al. | 197—20 |
| 2,341,775 | 2/1944 | Hawk | 74—157 X |
| 2,673,632 | 3/1954 | Stiranka | 74—157 X |
| 2,700,446 | 1/1955 | Blodgett | 197—20 |
| 2,769,518 | 11/1956 | Faulkner et al. | 197—20 |
| 2,894,614 | 7/1959 | Lambert et al. | 197—20 |
| 2,937,702 | 5/1960 | Augustin et al. | 234—124 |
| 2,983,155 | 5/1961 | Norton | 74—125 |
| 2,989,282 | 6/1961 | White | 251—61 |
| 3,063,538 | 11/1962 | Sansele | 197—20 |
| 3,083,943 | 4/1963 | Stewart et al. | 251—61 |

WILLIAM B. PENN, *Primary Examiner.*

EUGENE R. CAPOZIO, ROBERT E. PULFREY,
*Examiners.*